United States Patent
Agbor et al.

(10) Patent No.: US 11,242,082 B2
(45) Date of Patent: Feb. 8, 2022

(54) STEERING COLUMN FOR A MOTOR VEHICLE

(71) Applicants: THYSSENKRUPP PRESTA AG, Eschen (LI); thyssenkrupp AG, Essen (DE)

(72) Inventors: Thomas Agbor, Homburg (DE); Thomas Geiselberger, St. Gallen (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 782 days.

(21) Appl. No.: 16/071,702

(22) PCT Filed: Jan. 19, 2017

(86) PCT No.: PCT/EP2017/051027
§ 371 (c)(1),
(2) Date: Jul. 20, 2018

(87) PCT Pub. No.: WO2017/129461
PCT Pub. Date: Aug. 3, 2017

(65) Prior Publication Data
US 2021/0197883 A1 Jul. 1, 2021

(30) Foreign Application Priority Data
Jan. 26, 2016 (DE) .................. 10 2016 201 065.4

(51) Int. Cl.
*B62D 1/184* (2006.01)
*B62D 1/185* (2006.01)
(52) U.S. Cl.
CPC ............. *B62D 1/184* (2013.01); *B62D 1/185* (2013.01)
(58) Field of Classification Search
CPC ......... B62D 1/184; B62D 1/185; B62D 1/195
See application file for complete search history.

(56) References Cited

U.S. PATENT DOCUMENTS

| 5,199,319 A * | 4/1993 | Fujiu ..................... B62D 1/184 280/775 |
| 6,948,741 B2 * | 9/2005 | Manwaring ............ B62D 1/184 280/775 |

(Continued)

FOREIGN PATENT DOCUMENTS

| CN | 204452560 U | 7/2015 |
| CN | 104943732 A | 9/2015 |

(Continued)

OTHER PUBLICATIONS

English Translation of International Search Report issued in PCT/EP2017/051027, dated Mar. 30, 2017 (dated Apr. 7, 2017).

*Primary Examiner* — Laura Freedman
(74) *Attorney, Agent, or Firm* — thyssenkrupp North America, LLC (57) ABSTRACT

A steering column includes an adjustment unit having a steering spindle rotatably supported in a casing pipe about a longitudinal axis. A carrier unit configured to receive the casing pipe includes at least one clamping face facing the casing pipe. A clamping device clamps the clamping face against the casing pipe to longitudinally fix the adjustment unit relative to the carrier unit, releases the clamping face from the casing pipe and releases an adjustment of the adjustment unit relative to the carrier unit at least in the longitudinal direction. The carrier unit includes at least one sliding face facing the casing pipe along which the casing pipe can be moved longitudinally in the release position. The sliding face may be arranged on a support device which presses the sliding face against the casing pipe with a support force which can be predetermined independently of the clamping force.

20 Claims, 3 Drawing Sheets

(56) References Cited

U.S. PATENT DOCUMENTS

| | | | | |
|---|---|---|---|---|
| 7,677,132 B2* | 3/2010 | Oh | ................ | B62D 1/185 |
| | | | | 74/493 |
| 8,408,089 B2* | 4/2013 | Oshita | ................ | B62D 1/195 |
| | | | | 74/492 |
| 8,550,497 B2* | 10/2013 | Takezawa | ................ | B62D 1/184 |
| | | | | 280/775 |
| 8,601,901 B2* | 12/2013 | Ishii | ................ | B62D 1/184 |
| | | | | 74/493 |
| 8,651,526 B2* | 2/2014 | Nakamura | ................ | B62D 1/195 |
| | | | | 280/777 |
| 8,746,740 B2* | 6/2014 | Tanaka | ................ | B62D 1/18 |
| | | | | 280/777 |
| 8,943,923 B2* | 2/2015 | Kakishita | ................ | B62D 1/187 |
| | | | | 74/493 |
| 9,327,756 B2* | 5/2016 | Rauber | ................ | B62D 1/181 |
| 2009/0200783 A1 | 8/2009 | Cymbal | | |
| 2012/0318092 A1* | 12/2012 | Kuroumaru | ................ | B62D 1/195 |
| | | | | 74/492 |
| 2015/0266499 A1 | 9/2015 | Yoshihara | | |
| 2016/0052536 A1* | 2/2016 | Nicolussi | ................ | B62D 1/185 |
| | | | | 384/441 |
| 2016/0144884 A1 | 5/2016 | Butler | | |

FOREIGN PATENT DOCUMENTS

| | | |
|---|---|---|
| DE | 199 45 164 A | 4/2000 |
| DE | 10 2009 036 629 A | 2/2010 |
| DE | 10 2008 060 225 A | 6/2010 |
| DE | 10 2010 037 312 B | 1/2012 |
| DE | 10 2013 103 328 A | 10/2014 |
| EP | 2 611 673 A | 7/2013 |
| EP | 2 855 237 A | 4/2015 |
| WO | 2014/202964 A | 12/2014 |

* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2017/051027, filed Jan. 19, 2017, which claims priority to German Patent Application No. DE 10 2016 201 065.4, filed Jan. 26, 2016, the entire contents of both of which are incorporated herein by reference.

FIELD

The present disclosure generally relates to a steering column for a motor vehicle, including an adjustment unit having a steering spindle which is supported in a casing pipe so as to be able to be rotated about the longitudinal axis.

BACKGROUND

In order to adapt the steering wheel position to the seating position of the driver of a motor vehicle, such steering columns are known in various embodiments in the prior art. For longitudinal adjustment, the steering wheel which is fitted to the rear end of the steering spindle in generic steering columns can be positioned in the longitudinal direction, that is to say, in the direction of the steering column longitudinal axis in the vehicle inner space.

The longitudinal adjustability is brought about by the adjustment unit which comprises the steering spindle which is rotatably supported in a casing pipe being able to be adjusted in a telescope-like manner in the longitudinal direction relative to the carrier unit, which provides a retention member of the steering column which is securely connected to the vehicle bodywork, and being able to be secured, that is to say, releasably fixed, by means of a releasable clamping device in different longitudinal positions, in which the clamping force or the pressing force between the carrier unit and casing pipe is reduced. The clamping device, which is also referred to as a securing device, acts on the adjustment unit retained by the carrier unit, wherein in the open state of the clamping device—also referred to as a release position or disengaged position—a displacement of the adjustment unit with respect to the carrier unit in the longitudinal direction is possible in order to adjust the steering wheel position and in the closed state—referred to as the fixing position or securing position—the adjustment unit is clamped to the carrier unit and during normal travel operation the steering wheel position is fixed under the mechanical loads which may be anticipated.

A clamping device, as described, for example, in DE 10 2008 060 225 A1 comprises a clamping gear mechanism having an actuation element, for example, a clamping axle, which can be driven by means of a manually adjustable operating lever or an electromotive actuation device. As a result of the clamping gear mechanism, a rotation movement of the clamping axle can, for example, be converted into a clamping stroke of the clamping face which is directed transversely relative to the longitudinal axis so that in the transverse direction a clamping force is applied to the carrier unit. In this instance, at least one clamping face which is formed on the carrier unit is pressed in a frictionally engaging manner against the outer side of the casing pipe so that the adjustment unit is clamped in a non-positive-locking manner to the carrier unit, in a comparable manner to the function of a clamp. By means of transposed actuation of the actuation element, the clamping device can be moved into the release position, also referred to as the disengaged position, wherein the clamping force is relaxed and the non-positive-locking connection is thereby released.

So that the casing pipe, in the release position, when the adjustment unit is displaced as a result of play between the outer side of the casing pipe and the clamping face, cannot tilt in the carrier unit and undesirable rattling noises or an operating sensation which is perceived to be unpleasant occur, it has been proposed in DE 10 2010 037 312 B2 that the casing pipe be supported relative to the carrier unit in a longitudinally displaceable manner on sliding faces on the carrier unit which are constructed separately from the clamping faces and which lie against the outer side of the casing pipe in a state adjusted in a play-free manner to the greatest possible extent. Tilting can thereby be reduced and the operating sensation when adjusting the steering wheel position can thereby be improved.

During adjustment, however, stick-slip or sprag-slip effects which occur between the clamping or sliding faces and the casing pipe between the mutually adjacent surfaces may impair the desired uniform sliding behavior.

Thus a need exists for a steering column with an improved adjustability.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a steering column for a motor vehicle, including an adjustment unit having a steering spindle which is supported in a casing pipe so as to be able to be rotated about the longitudinal axis thereof. A carrier unit is connectable to the bodywork of the motor vehicle and in which the casing pipe can be received includes at least one clamping face facing the casing pipe. A clamping device in the fixing position clamps the clamping face against the casing pipe with a clamping force in order to fix the adjustment unit relative to the carrier unit at least in the longitudinal direction and in the release position releases the clamping face from the casing pipe and releases an adjustment of the adjustment unit relative to the carrier unit at least in the longitudinal direction. The carrier unit includes at least one sliding face which faces the casing pipe and along which the casing pipe can be moved in the longitudinal direction in the release position.

In order to solve the above-mentioned problem, it is proposed according to the invention that in some examples, the sliding face may be arranged on a support device which presses the sliding face against the casing pipe with a support force which can be predetermined independently of the clamping force.

In a preferred embodiment of the invention, the clamping device comprises an actuation element which cooperates with a clamping gear mechanism which converts an actuation of the actuation element from the release position into the fixing position into a clamping force which is directed transversely relative to the longitudinal axis and which acts on the clamping face in order to clamp the carrier unit to the casing pipe.

According to the invention, the sliding face is constructed separately from the clamping face and is brought into contact with the outer side of the casing pipe independently of the clamping face. To this end, there is used a support device which produces a support force which is supported on the carrier unit and which at the same time ensures that the sliding face in order to provide a sliding contact is pressed in a defined manner against the outer side of the casing pipe. As a result of the fact that the support force which is provided by the support device can be predetermined independently of the clamping force provided by the clamping device, it is accordingly possible to adjust the friction forces which occur when the steering column is adjusted between the sliding face and an outer side, that is to say, an outer covering face of the casing pipe, independently of the clamping force. The adjustment of the friction forces between the outer side of the casing pipe and the sliding face, which includes static and sliding friction forces, is carried out according to the invention by adjusting the pressing force which is applied by the support device via the sliding face to the casing pipe, that is to say, the support force.

An advantage with respect to known devices for adjusting the play is that a spacing is not predetermined between the casing pipe and the sliding face, but instead a defined pressing force, and consequently also a defined friction force with respect to a relative displacement of the casing pipe and carrier unit. It is thereby possible to homogenize the actuation force required for adjustment.

The sliding face is preferably formed on a sliding member which is supported so as to be able to be moved toward and counter to the casing pipe. The support enables, on the one hand, a movement of the sliding member toward the outer side of the casing pipe, wherein, as a result of the support device according to the invention, the sliding face is pressed with a defined supporting force against the casing pipe in order to provide a predetermined friction force. On the other hand, it is possible for a counter-force which is directed counter to the support force to be introduced into the support device by the casing pipe. It is thereby possible on the sliding face for an equilibrium of forces of the support force to be adjusted with the forces which are actually acting on the adjustment unit. The movability may, for example, be brought about by a linear guiding of the sliding member transversely relative to the outer face of the casing pipe, or also by means of pivot bearings or the like.

The support device may comprise a resilient element and/or an actuator. The resilient element or the actuator forms a force production element which uses the carrier unit as an abutment and which relative thereto applies to the sliding member the support force which is directed against the casing pipe and by means of which the sliding face is pressed against the outer side of the casing pipe. With a resilient element, this is the pretensioning as a result of the acting resilient force. As a result of the resilient characteristic line, a resilient element is very suitable for maintaining the required support force and resiliently absorbing oscillations which may occur, for example, as a result of acceleration or inertial forces which occur during operation. It is possible, for example, to use a pressure spring as a resilient element which can be provided as a standard structural element with the required properties in a cost-effective manner and which enables a reliable and low-maintenance permanent operation. Alternatively, or where applicable additionally, an active actuator may be provided in order to load the sliding member with a defined support force, for example, an electric or electromagnetic force generator. This enables an active adjustment and a regulation of the support force in order to adjust the friction force in a selective manner or to keep the friction force constant under changing operating conditions.

An advantageous embodiment of the invention makes provision for the sliding member to be arranged in a recess which is open in the direction toward the casing pipe in the carrier unit. The recess may, for example, be constructed at the inner side of the receiving member for the casing pipe as a groove, bead or blind hole in which the sliding member is inserted in such a manner that the sliding face thereof extends in the open opening cross-section. The support device used between the sliding member and the carrier unit, for example, a pressure spring, is supported on the closed base of the recess, for example, on the base of the groove or bead, wherein the support force applied to the sliding face is directed outward with respect to the opening of the recess. Consequently, the recess may take over the guiding of the sliding member relative to the outer side of the casing pipe and is used by the support device as an abutment on the carrier unit. Finally, the recess as a result of its depth limits the possible movement of the sliding member toward the outer side when viewed from the casing pipe. The recess may preferably be constructed in an integral manner in the carrier unit, for example, as a plastically formed impression, which can be produced in a low-cost manner in technical production terms.

It is possible for the recess to be arranged in the region of a clamping face or adjacent thereto. The support force may thereby have a common force component with the clamping force, that is to say, the clamping force acts in the fixed state partially counter to the support force. It is also possible for the recess to be arranged with spacing from a clamping face in such a manner that the clamping force and the support force are transverse with respect to each other and—with a perpendicular arrangement—have no common force component and as a result can act independently of each other on the casing pipe.

An advantageous embodiment of the invention makes provision for the sliding face to be able to be recessed relative to the casing pipe in the carrier unit in a flush-mounted manner. An arrangement which is recessed in a flush-mounted manner may, for example, be achieved by the sliding face being arranged on a sliding member which can be inserted or introduced in a state directed outward from the casing pipe deeply into a recess in the carrier device until the sliding face is located in the plane of the free open cross-section. That is to say, the sliding face no longer protrudes from the carrier unit against the casing pipe so that the casing pipe can no longer slide alone on the sliding face, but at least at the same time comes into contact with the carrier unit, for example, a clamping face, via the outer face thereof in at least one region beside the sliding face.

A particular functionality can be achieved with the above-mentioned recessable arrangement in that the sliding face is arranged inside or adjacent to a clamping face. In the fixing position, at least one part-component of the clamping force applied by the clamping device in the direction of the clamping face over the sliding face on the sliding member thereby counteracts the support force. As a result of the fact that the component of the clamping force directed against the sliding face is greater than the support force, the support member is urged so far back into a recess that the clamping face in the region surrounding the sliding face or adjacent to the sliding face is in abutment with the casing pipe in a non-positive-locking or frictionally engaging manner. If the clamping device is now released, that is to say, moved into the release position, the clamping force is reduced and the sliding face is pressed with the support force against the casing pipe. By means of corresponding specification of the support force, the sliding face can thereby protrude from the recessed position relative to the clamping face and a rattling during the movement of the casing pipe relative to the carrier unit can be prevented. In this protruding sliding position, the casing pipe consequently has with the outer side thereof less or no more contact with the clamping face, but instead only with the sliding face. A defined and uniform sliding behavior of the casing pipe in the carrier unit for adjusting the steering column in the release position of the clamping device can thereby be predetermined. If the steering column is fixed again, the sliding member is moved by the clamping force applied to the casing pipe until it is recessed in the carrier unit and the clamping face comes into frictional engagement. A different clamping or sliding plane is thereby involved on relative to the carrier unit. A uniform, easy sliding during the adjustment of the steering column can thereby be achieved, regardless of a reliably high retention force as a result of a frictionally engaging clamping of the clamping face with the casing unit.

As a result of the arrangement of the sliding face inside or adjacent to the clamping face, a particularly compact, operationally reliable structure can be produced.

It is further advantageous for the support force applied by the support device to the sliding face to be directed counter to the direction of a weight force and consequently counter to the direction of gravitational force. In this instance, the sliding face or the sliding member which comprises the sliding face is arranged in the carrier unit below the casing pipe. The support force acts counter to the weight force of the adjustment unit caused by the gravitational force in an upward direction and presses the sliding face from below against the casing pipe. In this instance, it is advantageous for the support force to be greater than or equal to the component of the weight force of the adjustment unit applied to the sliding face including attachments which are fitted thereto. The weight force of attachments which are fitted to the movable adjustment unit, such as in particular the steering wheel and the steering column switch supplements the weight force which is applied via the outer side of the casing pipe to the sliding face. As a result of the fact that the support force is predetermined to be at least so large that it can compensate for all the weight force which acts on it, the casing pipe is held in position on the sliding face when the clamping device is released when the clamping face is moved out of the clamping engagement. Whilst in the prior art, as a result of the active weight force, the adjustment unit can tilt in the carrier unit when the clamping device is released and even a small play during adjustment can lead to undesirable rattling noises, this is largely prevented by the change from the clamping plane to the sliding plane according to the invention. Furthermore, it is conceivable and possible for the support force to be smaller than the weight force acting on it. In this instance, there is the force distribution between the clamping faces of the carrier unit and the casing pipe.

It is further advantageous for the sliding face to be constructed in a friction-reducing manner and/or the clamping face to be constructed in a friction-increasing manner with respect to friction on the casing pipe. It is thereby possible for the casing pipe, in order to move the steering column into the release position of the clamping device, to be able to slide readily and in a uniform manner in the longitudinal direction of the longitudinal axis on the sliding face, and in the fixing position of the clamping device for the clamping face to be securely clamped to the carrier unit in a non-positive-locking manner.

In the different Figures, components which are identical are always provided with the same reference numerals and are therefore generally also only named or mentioned once.

Figure 1:
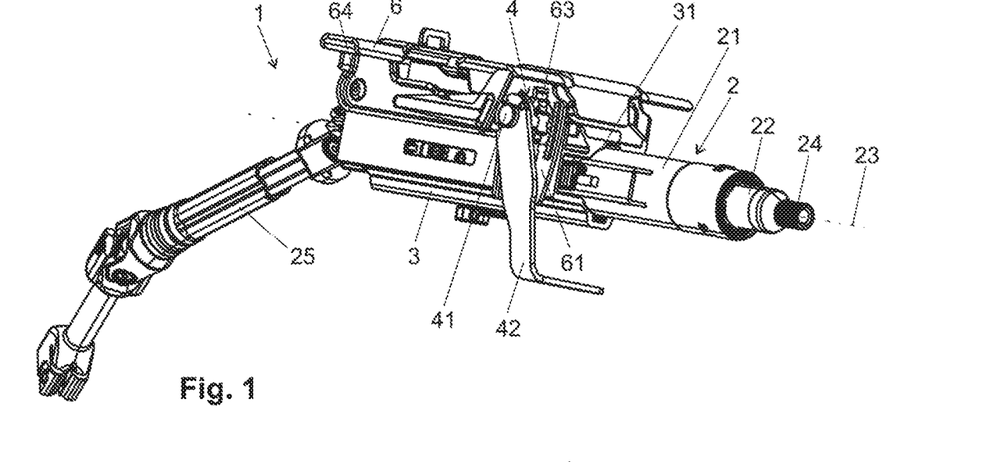
FIG. 1 is a schematic, perspective view of a steering column.

FIG. 1 is a perspective view of a steering column 1 which comprises an adjustment unit 2 with a casing pipe 21 in which a steering spindle 22 is rotatably supported about the longitudinal axis 23. A steering wheel which is not illustrated can be secured to a rear securing portion 24 with respect to the travel direction. The steering spindle 22 extends when viewed from the securing portion 24 forward through the adjustment unit 2 to the steering gear mechanism side, where an output shaft 25 which is connected to a steering gear mechanism which is not illustrated is connected.

The adjustment unit 2 is received in a carrier unit 3, wherein the casing pipe 21 is arranged in a receiving opening 31 which extends through coaxially with respect to the longitudinal axis 23.

The receiving opening 31 has a passage cross-section which is cylindrical in the basic shape and which is adapted to the cylindrical outer form of the casing pipe 21.

Figure 2:
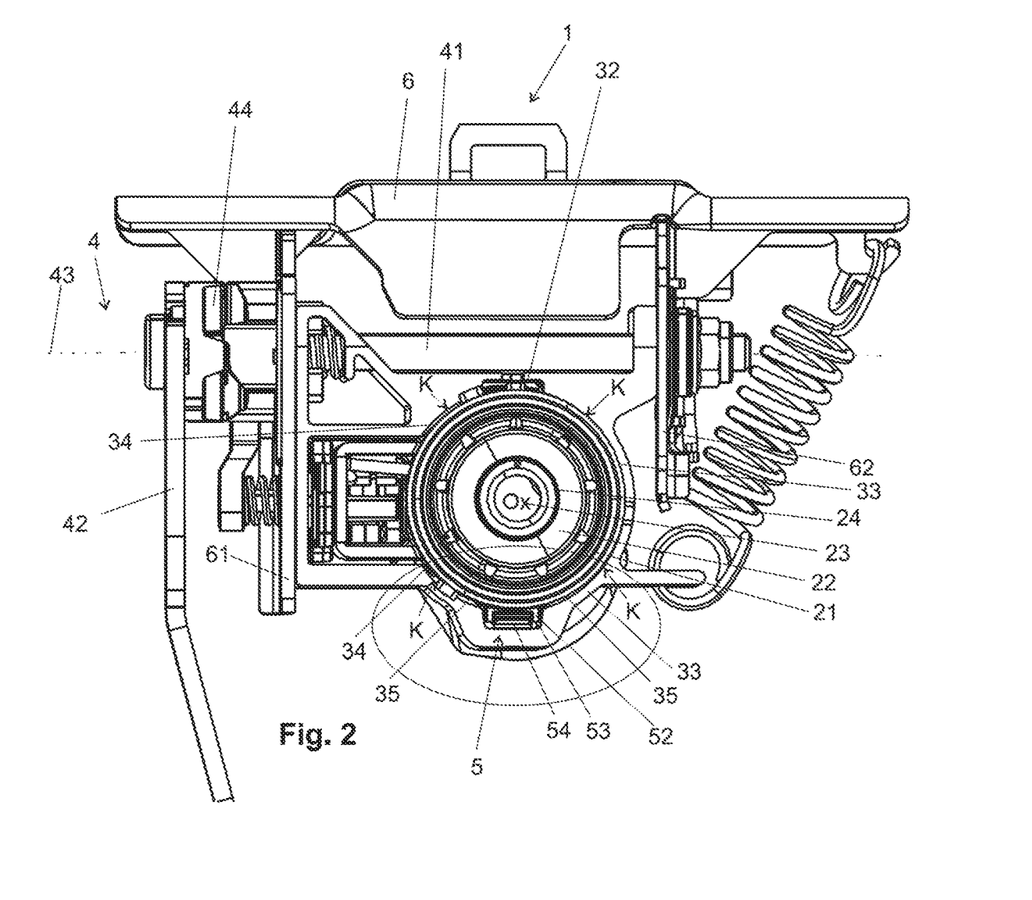
FIG. 2 is a longitudinal view in the direction of the steering column according to FIG. 1.

The carrier unit 3 has a slot 32 which extends through longitudinally in the direction of the longitudinal axis 23 in the wall of the receiving opening 31 and which can be clearly seen in the front axial view on the securing portion 24 in FIG. 2. Wall portions 33 and 34 of the receiving opening 31 which are separated by the slot 32 extend in a peripheral direction.

A clamping device 4 comprises a clamping axle 41 which is arranged transversely relative to the longitudinal axis 23 and consequently transversely relative to the slot 32 on the carrier unit 3 and which, bridging the slot 32, engages on the wall portions 33 and 34. On the clamping axle 41, there is fitted as an actuation element a manually operable actuation lever 42 by means of which the clamping axle 41 can be pivoted about the rotation axis 43 thereof. Via a clamping gear mechanism 44, for example, with axially mutually adjacent cam or wedge disks, tilting pins or the like, a rotational movement of the clamping axle 41 is converted into a clamping stroke which pulls together the wall portions 33 and 34 against each other along the slot 32, that is to say, brings about a reduction of the slot width of the slot 32.

If the clamping device 4 is closed by pivoting the actuation lever 42, the wall portions 33 and 34 are moved against each other so that the clamping face 35 on the inner face of the receiving opening 31 is pressed against the outer face of the casing pipe 21 located therebetween. There is thereby adjusted the fixing position in which the cylindrical-cover-like clamping face 35 is pressed over the entire periphery thereof radially against the cylindrical-cover-like outer face of the casing pipe 21. In this instance, the clamping force K which is indicated in FIG. 2 with a plurality of force arrows which are distributed over the periphery is active between the mutually adjacent faces. As a result of the clamping force K, the casing pipe 21 is connected to the carrier unit 3 at the outer face thereof in a frictionally engaging manner via the clamping face 35 which is formed on the inner side of the receiving opening 31. The adjustment unit 2 is thereby clamped to the carrier unit 3 and fixed with respect to a displacement in the direction of the longitudinal axis 23. Accordingly, the steering wheel position is fixed.

By pivoting the actuation lever 42 in the opposite direction, the clamping device is moved into the release position, that is to say, opened. In this instance, the wall portions 33 and 34 are no longer pressed against each other, whereby there is no longer a clamping force K between the clamping face 35 and the outer face of the casing pipe 21. As a result of the omission of the frictionally engaging connection, the casing pipe 21 can now be axially displaced in order to adjust the steering wheel position in or counter to the direction of the longitudinal axis 23 relative to the carrier unit 3 inside the receiving opening.

A support device 5 is arranged in the lower region with respect to the direction of gravitational force, in this instance at the side of the receiving opening 31 of the carrier unit 3 opposite the slot 32. This comprises a sliding face 51 which is arranged in the receiving opening 31 and which faces the casing pipe 21 and which is in abutment with the outer side of the casing pipe 21. The sliding face 51 is formed on a sliding member 52 which is arranged in a recess 53 in the inner face of the receiving opening 31. As can be seen in the enlarged detailed illustration of FIG. 3, the recess 53 is located in the peripheral direction between portions of the clamping face 35 so that the sliding face 51 which extends in the opening cross-section of the recess 53 which is open in the direction toward the casing pipe 21 is also delimited by the clamping face 35, or, in other words, is located within the clamping face 35.

Figures 3, 4:
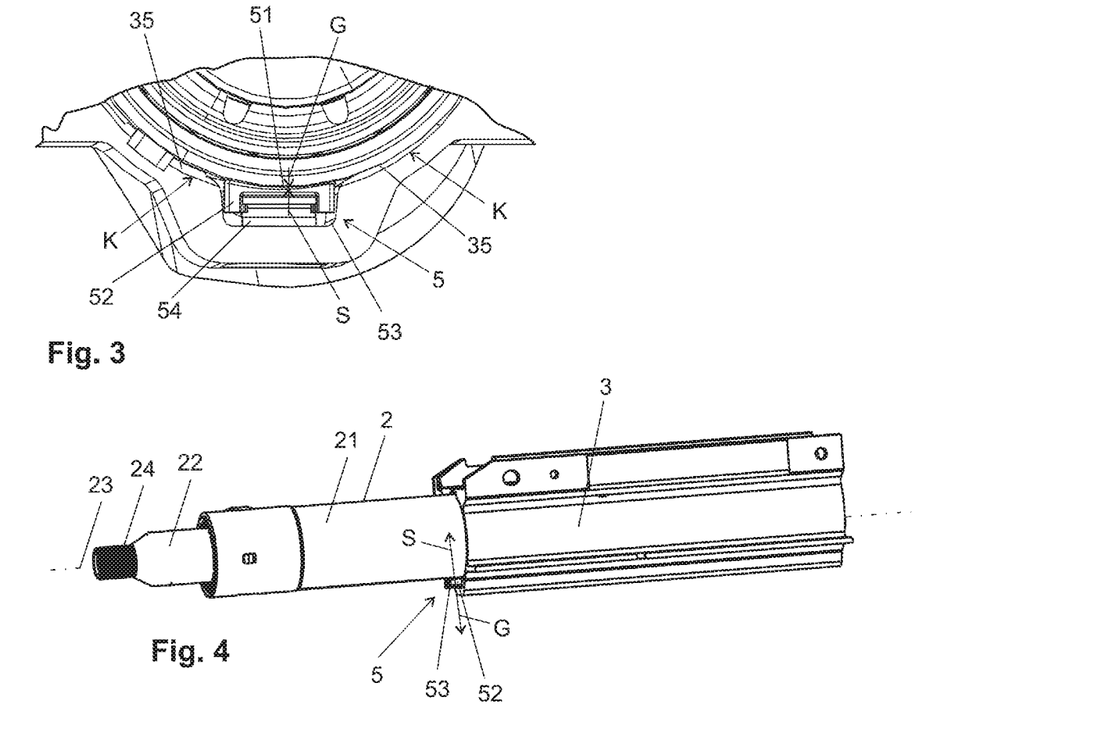
FIG. 3 is a detailed view from FIG. 2.
FIG. 4 is a perspective view of the carrier unit of the steering column according to FIG. 1 with the adjustment unit inserted therein.

The depth of the recess 53, measured in a radial direction from the longitudinal axis 23, is greater than or at least equal to the dimension of the sliding member 52 in this direction. The sliding member 52 can thereby be inserted so deeply into the recess 53 that the sliding face 51 is recessed therein at least in a flush-mounted manner. The casing pipe 21 can thereby abut in a frictionally engaging manner in the fixing position with the cylindrical outer face thereof in the regions of the clamping face 35 which are adjacent to the recess 53, wherein the sliding member 52 is completely urged back into the clamping face 35, that is to say, the sliding face 51 does not protrude when directed counter to the casing pipe 21 beyond the clamping face 35.

In the recess 53, there is arranged a resilient element 54 which is pretensioned in such a manner against the sliding member 52 that it presses the sliding face 51 with a support force S against the outer face of the casing pipe 21. The resilient element 54 is in the example illustrated constructed in the form of a spring steel sheet molded component which is bent in the form of a curved member.

FIG. 3 shows the steering column 1 in the release position, in which the clamping device 4 is open and accordingly no clamping force is applied by the clamping face 35 to the outer face of the casing pipe 21. As a result of the gravitational force which is directed downward, the casing pipe 21 weighs on the sliding face 51 with a force component G of the weight force thereof, which is dependent on the inclination of the steering column 1 and the attachments which are fitted to the adjustment unit 2, such as the steering wheel, steering column switch and the like.

The resilient element 54 is supported on the base of the recess 53 against the adjustment unit 3 and applies via the sliding face 51 the support force S to the lower outer face of the casing pipe 21. As a result of the fact that the value of the support force S is greater than or at least equal to the force component of the weight force G acting in the direction of the casing pipe 21 on the sliding face 51, the casing pipe 21 and consequently the adjustment unit 2 is retained inside the receiving opening 31 parallel with the longitudinal axis 23. The value of the support force S may also be smaller than the force component of the weight force G. As a result of a force distribution between the friction members involved, between the clamping faces 35 and the casing pipe 21, the casing pipe 21 is retained inside the receiving opening 31 parallel with the longitudinal axis 23. In particular if in the relaxed state of the release position, as a result of the resilience of the material and the force component G which is transmitted via the casing pipe 21, the casing pipe 21 is slightly expanded and play occurs between the clamping face 35 and the outer face of the casing pipe 21, the casing pipe 21 may tilt to a smaller extent relative to the carrier unit 3. In this instance, the casing pipe 21 is lifted by the support device 5 from the clamping face 35 counter to the gravitational force and is then supported on the sliding face 51. The adjustment unit 2 can thereby be moved smoothly forward or backward in the direction of the longitudinal axis 23 in order to adjust the steering wheel position. In order to reduce friction during adjustment, the sliding face 51 may, for example, be provided with a friction-reducing sliding coating.

If the clamping device 4 is moved into the fixing position, the outer face of the casing pipe 21 and the clamping face 35 are pressed against each other with the clamping force K, as already illustrated in FIG. 3. Accordingly, via the sliding face 51, the sliding member 52 is moved by the clamping force K which is greater than the support force S so deep into the recess 53 that the sliding face 51 is recessed unto the carrier unit 3 in a flush-mounted manner and the clamping face 35 is in abutment with the casing pipe 21 in a frictionally engaging manner.

As a result of the support device 5 according to the invention which via the sliding face 51 can absorb the effective force component G of the adjustment unit 2 including attachments which are fitted thereon, disruptive stick-slip and sprag-slip effects between the casing pipe 21 and the clamping face 35 are reduced in the release position.

Figure 5:
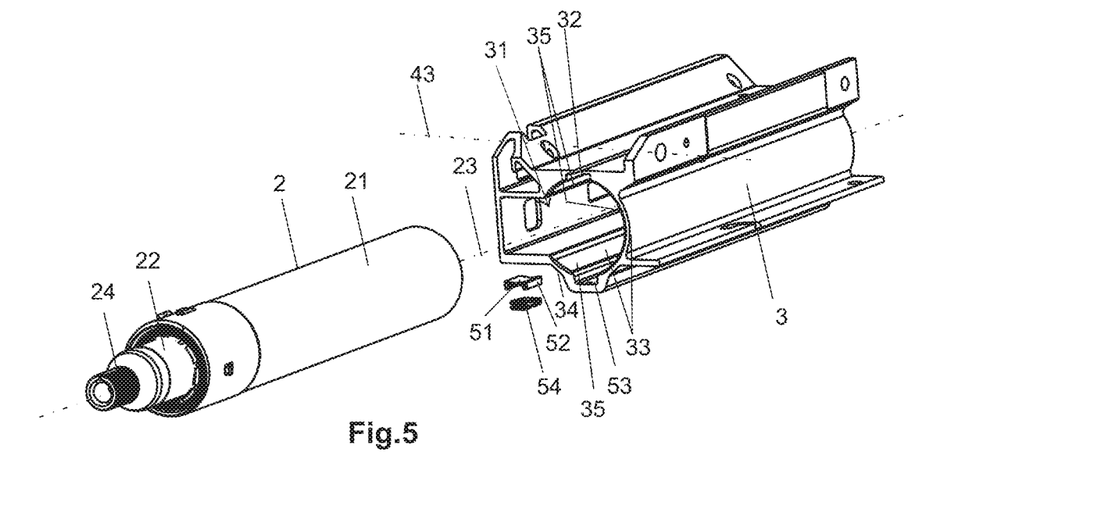
FIG. 5 is an exploded view of the carrier unit and the adjustment unit of FIG. 4.
Figure 6:
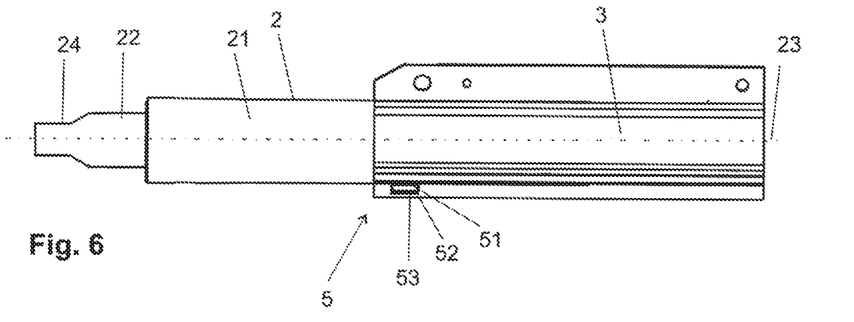
FIG. 6 is a side view of the carrier unit with the adjustment unit according to FIG. 4.

FIGS. 4 and 5 show the adjustment unit 2 and the carrier unit 3 once more separately in the assembled and disassembled state. The circular cylindrical cross-section of the casing pipe 21 and receiving opening 31 can be clearly seen therein. For example, the above-mentioned force components G and S are illustrated in FIG. 4. In particular, FIG. 5 clearly shows the construction of the recess 53 as a groove or bead which extends axially over the longitudinal extent of the carrier unit 3. In this instance, the recess 53 may be formed integrally in the carrier unit 3, for example, in an extruded profile which forms the base member. Such an extruded profile may, for example, be produced as an aluminum profile with a cross-section of complex shape in a cost-effective manner, wherein the slot 32 and the recess 53 can be provided without additional processing complexity. The support device 5 according to the invention may also be integrated with little complexity in such a predetermined profile. This is a significant advantage with respect to the known prior art.

FIGS. 1 and 2 show how the carrier unit 3 for fixing to a vehicle bodywork which is not illustrated can be fitted to a retention unit 6, also referred to as a console unit, which has two downwardly protruding, mutually opposing members 61 and 62 between which the carrier unit 3 is arranged. The clamping axle 41 engages through elongate holes 63 which extend transversely relative to the longitudinal axis 23 in these members 61 and 62 so that the carrier unit 3 can be pivoted for height adjustment about a pivot axis 64.

In the fixing position, the members 61 and 62 are pressed in a frictionally engaging manner against the carrier unit 3 so that a non-positive-locking connection is carried out and the carrier unit 3 is fixed relative to the retention unit 6.

LIST OF REFERENCE NUMERALS

1 Steering column
2 Adjustment unit
21 Casing pipe
22 Steering spindle
23 Longitudinal axis
24 Securing portion
25 Output shaft
3 Carrier unit
31 Receiving opening
32 Slot
33, 34 Wall portions
35 Clamping face
4 Clamping device
41 Clamping axle
42 Actuation lever
43 Rotation axis
44 Clamping gear mechanism
5 Support device
51 Sliding face
52 Sliding member
53 Recess
54 Resilient element
54 Retention unit
61, 62 Member
6 Elongate holes
63 Pivot axle
K Clamping force
S Support force
G Weight force

What is claimed is:

1. A steering column for a motor vehicle, comprising:
   an adjustment unit including a steering spindle and a casing pipe, the steering spindle rotatably supported in the casing pipe about a longitudinal axis thereof,
   a carrier unit configured to connect to the motor vehicle and receive the casing pipe, the carrier unit including at least one clamping face facing the casing pipe, and
   a clamping device configured in a fixing position to clamp the clamping face against the casing pipe with a clamping force to fix the adjustment unit relative to the carrier unit at least longitudinally and configured in a release position to release the clamping face from the casing pipe and release an adjustment of the adjustment unit relative to the carrier unit at least longitudinally,
   wherein the carrier unit includes at least one sliding face which faces the casing pipe and along which the casing pipe is longitudinally movable in the release position, and
   wherein the sliding face is arranged on a support device which presses the sliding face against the casing pipe with a support force predetermined independently of the clamping force,
   wherein the support device, the sliding face, the casing pipe, and the carrier unit are arranged such that the support force is exerted directly upwards on the casing pipe towards the longitudinal axis.

2. The steering column of claim 1, wherein the sliding face is formed on a sliding member which is supported so as to be able to be moved toward and counter to the casing pipe.

3. The steering column of claim 2, wherein the sliding member is arranged in a recess which is open in the direction toward the casing pipe in the carrier unit.

4. The steering column of claim 1, wherein the support device comprises an actuator.

5. The steering column of claim 1, wherein the sliding face is recessed relative to the casing pipe in the carrier unit in a flush-mounted manner.

6. The steering column of claim 1, wherein the support force is greater than or equal to a component of weight force of the adjustment unit that is applied to the sliding face including attachments which are fitted thereto.

7. The steering column of claim 1, wherein the sliding face is constructed in a friction-reducing manner and/or the clamping face is constructed in a friction-increasing manner with respect to friction on the casing pipe.

8. The steering column of claim 1 wherein the sliding face is disposed in a central recess of the carrier unit located directly beneath the casing pipe.

9. The steering column of claim 8 wherein the central recess is defined by three planar walls of the carrier unit.

10. The steering column of claim 1 wherein a vertical plane in which the longitudinal axis lies passes through the sliding face.

11. The steering column of claim 1 comprising an active actuator for loading the sliding face with a defined support force.

12. The steering column of claim 11 wherein the active actuator is an electromagnetic force generator.

13. The steering column of claim 1 comprising an actuator configured to adjust the support force to keep a friction force between the sliding face and the casing pipe constant as operating conditions in the steering column vary.

14. The steering column of claim 1 wherein the support force acts directly counter to a gravitational force.

15. The steering column of claim 1 wherein the support force is less than a component of weight force of the adjustment unit that is applied to the sliding face including attachments that are fitted thereto.

16. The steering column of claim 1 wherein the sliding face is part of a sliding member that is disposed directly between the casing pipe and a resilient member that is supported by the carrier unit.

17. A steering column for a motor vehicle, comprising:
   an adjustment unit including a steering spindle and a casing pipe, the steering spindle rotatably supported in the casing pipe about a longitudinal axis thereof, a carrier unit configured to connect to the motor vehicle and receive the casing pipe, the carrier unit including at least one clamping face facing the casing pipe, and a clamping device configured in a fixing position to clamp the clamping face against the casing pipe with a clamping force to fix the adjustment unit relative to the carrier unit at least longitudinally and configured in a release position to release the clamping face from the casing pipe and release an adjustment of the adjustment unit relative to the carrier unit at least longitudinally, wherein the carrier unit includes at least one sliding face which faces the casing pipe and along which the casing pipe is longitudinally movable in the release position, and wherein the sliding face is arranged on a support device which presses the sliding face against the casing pipe with a support force predetermined independently of the clamping force, wherein the support force operates perpendicular to a predominant direction of the clamping force.

18. The steering column of claim 17 wherein the support force applied by the support device to the sliding face is directed counter to the direction of a weight force.

19. The steering column of claim 17 wherein the support force is greater than or equal to a component of weight force of the adjustment unit that is applied to the sliding face including attachments which are fitted thereto.

20. A steering column for a motor vehicle, comprising:

an adjustment unit including a steering spindle and a casing pipe, the steering spindle rotatably supported in the casing pipe about a longitudinal axis thereof;

a carrier unit configured to connect to the motor vehicle and receive the casing pipe, the carrier unit including at least one clamping face facing the casing pipe; and a clamping device configured in a fixing position to clamp the clamping face against the casing pipe with a clamping force to fix the adjustment unit relative to the carrier unit at least longitudinally and configured in a release position to release the clamping face from the casing pipe and release an adjustment of the adjustment unit relative to the carrier unit at least longitudinally;

wherein the carrier unit includes at least one sliding face which faces the casing pipe and along which the casing pipe is longitudinally movable in the release position, and wherein the sliding face is arranged on a support device which presses the sliding face against the casing pipe with a support force predetermined independently of the clamping force, wherein the sliding face is part of a sliding member disposed in a recess of the carrier unit, wherein the sliding member is a solitary component and the steering column is free of other sliding members.

* * * * *